United States Patent [19]

Sato et al.

[11] Patent Number: 4,681,143

[45] Date of Patent: Jul. 21, 1987

[54] ELECTROMAGNETIC DIRECTIONAL CONTROL VALVE

[75] Inventors: Hiroki Sato, Acihi; Yukitomo Sanada, Okazaki; Yuji Yokoya, Toyota; Kazuo Masaki, Chiryu; Kiyohara Nakagawa, Kariya; Syuuji Murata, Nagoya, all of Japan

[73] Assignees: Toyota Jidosha Kabushiki Kaisha; Nippon Denso Kabushiki Kaisha, both of Japan

[21] Appl. No.: 813,144

[22] Filed: Dec. 24, 1985

[30] Foreign Application Priority Data

Dec. 27, 1984 [JP] Japan ............................... 59-273966
Apr. 23, 1985 [JP] Japan ................................. 60-87095

[51] Int. Cl.$^4$ ............................................. F16K 31/06
[52] U.S. Cl. ........................... 137/625.37; 137/625.38; 137/625.65; 188/299; 188/319; 251/129.1; 251/129.21; 335/256; 335/268
[58] Field of Search ...................... 137/625.37, 625.38, 137/625.65; 188/285, 299, 319; 251/129.1, 129.21; 335/256, 266, 268

[56] References Cited

U.S. PATENT DOCUMENTS 2,407,184  9/1946  Sparrow ........................... 251/129.1
3,357,454 12/1967  Koutnik ....................... 251/129.1 X
3,784,943  1/1974  Markowitz et al. ............ 335/268 X
4,144,514  3/1979  Rinde et al. ..................... 335/268 X

FOREIGN PATENT DOCUMENTS 57-115468  7/1982  Japan .

Primary Examiner—Gerald A. Michalsky
Attorney, Agent, or Firm—Finnegan, Henderson, Farabow, Garrett & Dunner

[57] ABSTRACT

An electromagnetic directional control valve for changing over flow paths of fluid comprises a plunger disposed in a case and being capable of moving from a neutral position in one axial direction by a first solenoid and in the other axial direction by a second solenoid to participate in the changeover of the flow paths. First and second stoppers bearing against the plunger are moved together with the plunger respectively in one axial direction and the other axial direction. First and second springs bias the first and second stopper respectively in the direction of abutting against the plunger. The plunger is stopped at the first neutral position held by the first and second springs, at a second position to which the plunger is moved in one axial direction by the first solenoid against the first spring and a third position to which the plunger is moved in the other axial direction by the second solenoid against the second spring.

18 Claims, 11 Drawing Figures

ELECTROMAGNETIC DIRECTIONAL CONTROL VALVE

BACKGROUND OF THE INVENTION

1. Field of the Invention

This invention relates to an electromagnetic directional control valve capable of changing over flow paths of fluid to three different positions and, more particularly to a compact electromagnetic directional control valve which can be housed in a tubular member having a relatively small size such as a piston rod.

2. Description of the Prior Art

A prior electromagnetic directional control valve as disclosed in the Utility Model Public Disclosure (KOKAI) No. 115468/82 for example, was constituted from a plurality of solenoid units (hereinafter referred to as electromagnetic means) arranged coaxially, one movable valve body moved by these electromagnetic means and at least two springs for directly supporting the movable valve body on both ends.

Thus, a force for stopping the movable valve body stationarily at a certain position is determined by the spring constant composed of the two springs. Hence, in the prior electromagnetic control valve, it was necessary to enlarge the spring constant composed of the two springs for stabilizing stationarily the movable valve body even when an external force, for example vibration, was applied in the direction of moving the movable valve body.

However, when the spring constant is enlarged, problems are encountered that when the movable valve body is moved against these springs, a large suction force is required to be produced by the electromagnetic means, resulting in the increase of electric power consumption of the electromagnetic means and the provision of a large-sized electromagnetic means.

SUMMARY OF THE INVENTION

An object of the present invention is to provide an electromagnetic directional control valve capable of enlarging a force for stopping stationarily a movable valve body (or plunger) with a spring having small spring constant.

Another object of the present invention is to provide an electromagnetic directional control valve which can be produced by a compact electromagnetic means and a valve body and be changed over to three different positions.

An electromagnetic control valve according to the present invention comprises a tubular case, first and second electromagnetic means fixed at an axial interval in the case, a plunger disposed in said case and being capable of moving from a neutral position in one axial direction by said first electromagnetic means and in the other opposite axial direction by said second electromagnetic means to participate in the changeover of said flow paths, a first stopper member bearing against the plunger to be moved together therewith in one axial direction, a second stopper member bearing against the plunger to be moved together therewith in the other axial direction and first and second means respectively biasing said first and second stopper members in the direction of abutting against said plunger, said plunger being stopped at the first neutral position held by said first and second biasing means, at a second position to which said plunger is moved in one axial direction by the first electromagnetic means and at a third position to which said plunger is moved in the other axial direction by the second electromagnetic means.

According to an embodiment of the present invention, the plunger may serve also as a valve body. However, according to other embodiments a valve body which is separately formed may be connected to the plunger.

Normally, said plunger is biased by said first and second biasing means through said first and second stopper members to stop at the first position.

When said plunger is attracted in one axial direction by exciting said first electromagnetic means, said second stopper member biased by said second biasing means cannot be moved in said one axial direction. Thus, said plunger is attracted to said first electromagnetic means side against only said first biasing means through said first stopper member to stop at the second position. When said second electromagnetic means is excited, said plunger is attracted to said second electromagnetic means against only said second biasing means to stop at the third position.

Since normally said plunger is stationarily biased by said first and second biasing means, the stationarily stopping force is large. Also, when the first or second electromagnetic means is excited to move said plunger to the second or third position, the plunger is moved against only the biasing force of said first or second biasing means. As a result, the plunger or valve body is normally held at the stable neutral position even if the spring constant of each of the springs which are the biasing means is lessened. By lessening the spring constant, the force required to attract the plunger can be small so that said compact first and second electromagnetic means can be provided.

BRIEF DESCRIPTION OF THE DRAWINGS

The other objects and features of the present invention will become apparent from the following description of preferred embodiments of the invention with reference to the accompanying drawings, in which.

PREFERRED EMBODIMENTS OF THE INVENTION

Figure 1:
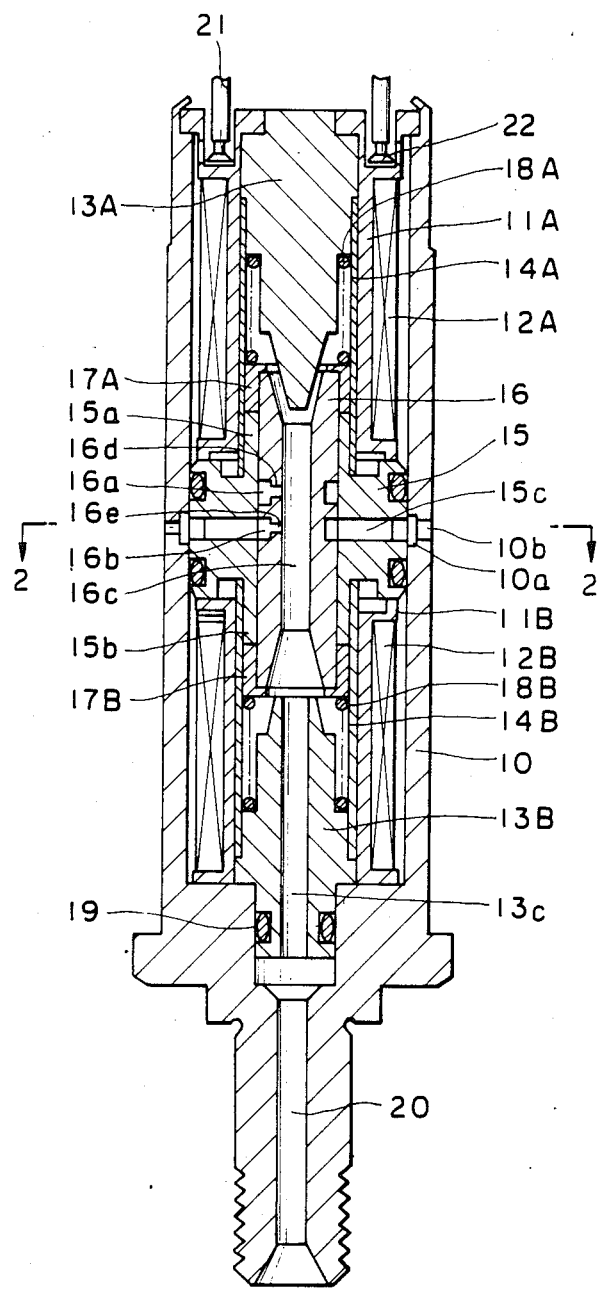
FIG. 1 is a longitudinal sectional view showing a first embodiment of an electromagnetic control valve according to the present invention.

Reference numeral 10 designates a yoke serving as a case and made generally cylindrically. In FIG. 1, a first electromagnetic means having a first bobbin 11A including a cylindrical portion, a first coil 12A and a first core 13A is fixed to an upper interior of the yoke 10. To the inside of the cylindrical portion of the first bobbin 11A is fixed a first sleeve 14A made of non-magnetic material.

A second electromagnetic means having a second bobbin 11B, a second coil 12B and a second core 13B is fixed to a lower interior of the yoke 10 coaxially with the first electromagnetic means. A second sleeve 14B is fixed to the inside of the cylindrical portion of the second bobbin 11B.

Figure 2:
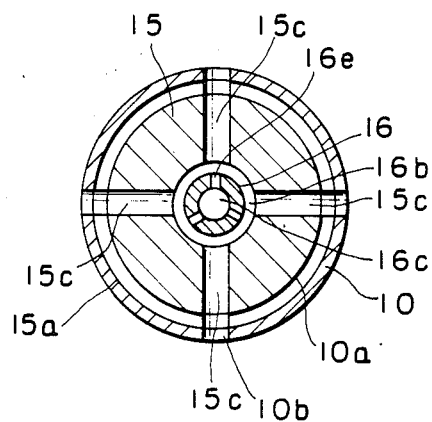
FIG. 2 is a sectional view taken along the line 2—2 in FIG. 1.

To an intermediate position between the first and second electromagnetic means, as shown in FIG. 2, is fixed a third cylindrical core 15 formed radially with four first ports 15c. The yoke 10 is formed on an inner peripheral surface with an annular groove 10a, from which are provided four holes 10b to an outer peripheral surface. Therefore, a necessary area of flow path is ensured even if the third core 15 is rotated to move the port 15c out of the hole 10b of the yoke 10. A cylindrical plunger 16 made of magnetic material is movably housed inside of the third core 15.

In the embodiment shown, the plunger 16 has annular grooves 16a,16b formed on its outer peripheral surface at an axial interval. Three orifices 16d,16e are radially formed to afford communication between a flow path 16c provided in the plunger 16 and said annular grooves 16a,16b respectively. Thus, the plunger 16 serves also as a valve body. Each of the orifices 16d is different from each of the orifices 16e in the size of bore so that different quantity of liquid can flow therethrough. All of orifices 16e do not align with all of ports 15c even if the plunger 16 is rotated, since the number of orifices 16e differs from that of the ports 15c. As a result, change of flow resistance hardly occurs.

The plunger 16 is provided on both ends with a first non-magnetic stopper 17A movable from a neutral position of the plunger in one axial direction together with the plunger 16 and a second non-magnetic stopper 17B movable from the neutral position in the other axial direction together with the plunger 16. The first and second stoppers 17A,17B are pressed to bear against the end faces of the plunger 16 respectively by first and second springs 18A,18B supported by the first and second cores 13A,13B and having relatively small spring constant respectively. The first stopper 17A is regulated not to move from a position in which it contacts one end 15a of said third core 15 to the lower portion of FIG. 1, i.e., toward the second electromagnetic means. Similarly, the second stopper 17B is regulated not to move from a position in which it contacts the other end 15b of the third core 15 toward the first electromagnetic means. Under these conditions occupies the plunger 16 the neutral position.

Further, in the drawing, reference numeral 13c designates a flow path provided in the center of the second core 13B, 19 a sealing O-ring, 20 a second port formed in the yoke 10, 21 lead wires for supplying current to the first and second coils 12A,12B and 22 terminals.

Next will be described the operation of the valve on the basis of said constitution.

Normally, i.e., when the both first and second coils 12A,12B are not excited, the plugner 16 is pressed by the first and second springs 18A,18B through the first and second stoppers 17A,17B to be located at the first position (hereinafter referred to as the neutral position). As a result, the first and second ports 15c,20 communicate to each other through the orifices 16e in the plunger 16.

When the first coil 12A is excited and the second coil 12B is not excited, the plunger 16 is attracted upward as viewed in FIG. 1. Then the second stopper 17B abuts against the end 15b of the third core 15 to be restrained from the movement above that position so that the plunger 16 is moved easily to the second position (hereinafter referred to as one side position) against only the set load of the spring 18A. As a result, the first and second ports 15c,20 are closed by the plunger 16 into the completely closed condition.

Next, when the first coil 12A is not excited and the second coil 12B is excited, the plunger 16 is attracted downward as viewed in FIG. 1. Then, the plunger 16, reversely to the above mentioned, is moved easiy to the third position (hereinafter refered to as the other side position) against only the set load of the second spring 18B. As a result, the first and second ports 15c,20 will communicate to each other through the orifices 16d in the plunger 16, the path area, i.e., flow resistance of the orifices 16d being different from that of the orifices 16e at said neutral position.

As above mentioned, a directional control valve is provided which is operatively changed over to three positions by controlling the current supply to the first and second coils 12A,12B.

Next, will be described a second embodiment of the present invention with reference to FIGS. 3 to 6.

The second embodiment differs from the first one mainly in that the plunger 16 is connected to a valve body 26 integrally through a non-magnetic shaft 25. Since other constitution and operation of the second embodiment are approximately similar to that of the first one, the description of same parts are omitted by applying same numerals.

Figure 6:
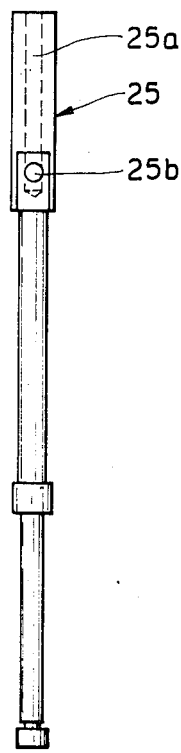
FIG. 6 is a front view showing a shaft which connects a plunger to a valve body of the electromagnetic control valve shown in FIG. 3.

The shaft 25 having one end forced fixedly coaxially in the central portion of the plunger 16 affords communication between spaces in which are housed the first and second springs 18A,18B through a communicating longitudinal hole 25a provided in the center of the shaft and a communicating lateral hole 25b provided radially as shown in FIG. 6. The valve body 26 having two annular grooves 26a,26b on an outer peripheral surface is fixed to the other end of the shaft 25 through a shim 27 and an E-ring 28 with the slight freedom to the shaft 25. The annular grooves 26a,26b are formed on positions spaced axially a predetermined interval from each other and have the path areas varied by the different widths and depths of the groove. Here, the path area of the groove 26a is set larger than that of the groove 26b.

Figure 4:
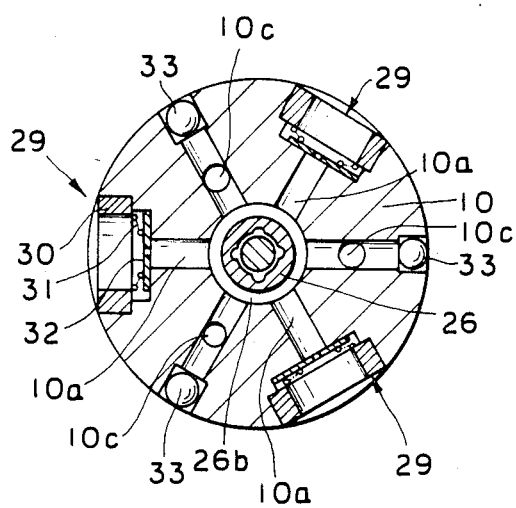
FIG. 4 is a sectional view taken along the line 4—4 in FIG. 3.

As shown in FIG. 4, the yoke 10 is provided with three radial ports 10a. On each end of the respective ports 10a is arranged a flow control valve 29.

The flow control valve 29 is constituted from a ring 30 forced fixedly from one end of the port 10a, a spring 31 having one end supported by the ring 30 and a plate 32 biased by the spring 31.

Figure 7:
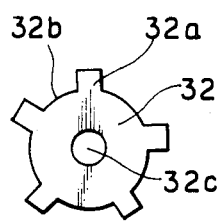
FIG. 7 is a front view showing a plate of a check valve of the electromagnetic control valve shown in FIG. 3.

As shown in FIG. 7, the plate 32 has a plurality of projections 32a and recesses 32b along an outer periphery and is formed in the center with an orifice 32c. Thus, when working fluid flows from the outside of the yoke 10 through the flow control valve 29 and the port 10a toward the central position of the yoke 10, the fluid flows through the orifice 32c in the plate 32. On the contrary when the fluid flows from the central portion of the yoke 10 toward the outside, the fluid moves the plate 32 against the spring 31 so that the working fluid flows through the recesses 32b and the orifice 32c of the plate 32. Accordingly, the flow rate through the port 10a and the flow control valve 29 will differ according to the direction of flow. Thus, the construction displays its effect when it is applied to a mechanism which is preferable to have large flow resistance in one direction of flow and small flow resistance in the opposite direction, an example of such mechanism being a throttle control means mounted on a shock absorber.

Figure 5:
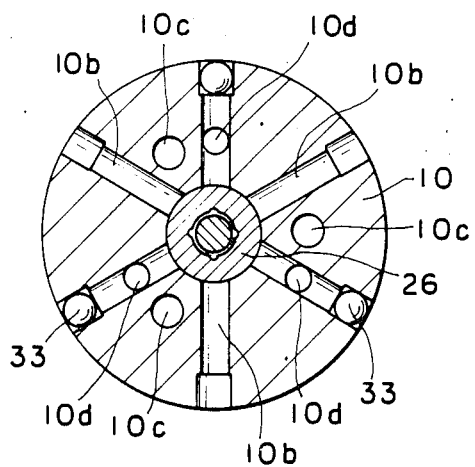
FIG. 5 is a sectional view taken along the line 5—5 in FIG. 3.

As shown in FIG. 5, the yoke 10 is formed with three radial ports 10b. The ports 10a and the ports 10b are arranged radially on a pair of imaginary planes spaced axially in the yoke 10 at a predetermined inteval (equal to the interval between the annular grooves 26a,26b of the valve body 26 in this case), and further arranged such that they have different peripheral phases. Each port 10b is not provided with the check valve 29.

Each one end of the ports 10a,10b has a steel ball 33 forced therein and is sealed. A longitudinal hole 10c provided axially in the yoke 10 communicates to a position near the steel ball 33 in each port 10a. Also, a longitudinal hole 10d provided axially in the yoke 10 communicates to a position near the steel ball 33 in each port 10b. The longitudinal holes 10c,10d communicate to a port 34 provided in a second yoke 10' integral with the yoke 10.

Further, in the drawings, reference numeral 35 designates a holding plate and 36 a cover. To respective upper and lower ends of the first and second springs 18A,18B are opened small holes 13d,13e in the first and second cores 13A,13B so that the respective springs are not sealed. Also, the plunger 16 is guided to smoothly move along an inner peripheral surface of the third core 15 by a plurality of balance grooves 16i formed on an outer periphery of the plunger.

Next will be described the operation of the second embodiment correspondingly to the three positions in the first embodiment. Since the movement of the plunger 16 due to exciting the first and second magnetic means is similar to that of the first embodiment, the operation of the valve body will be described hereinafter.

Figure 3:
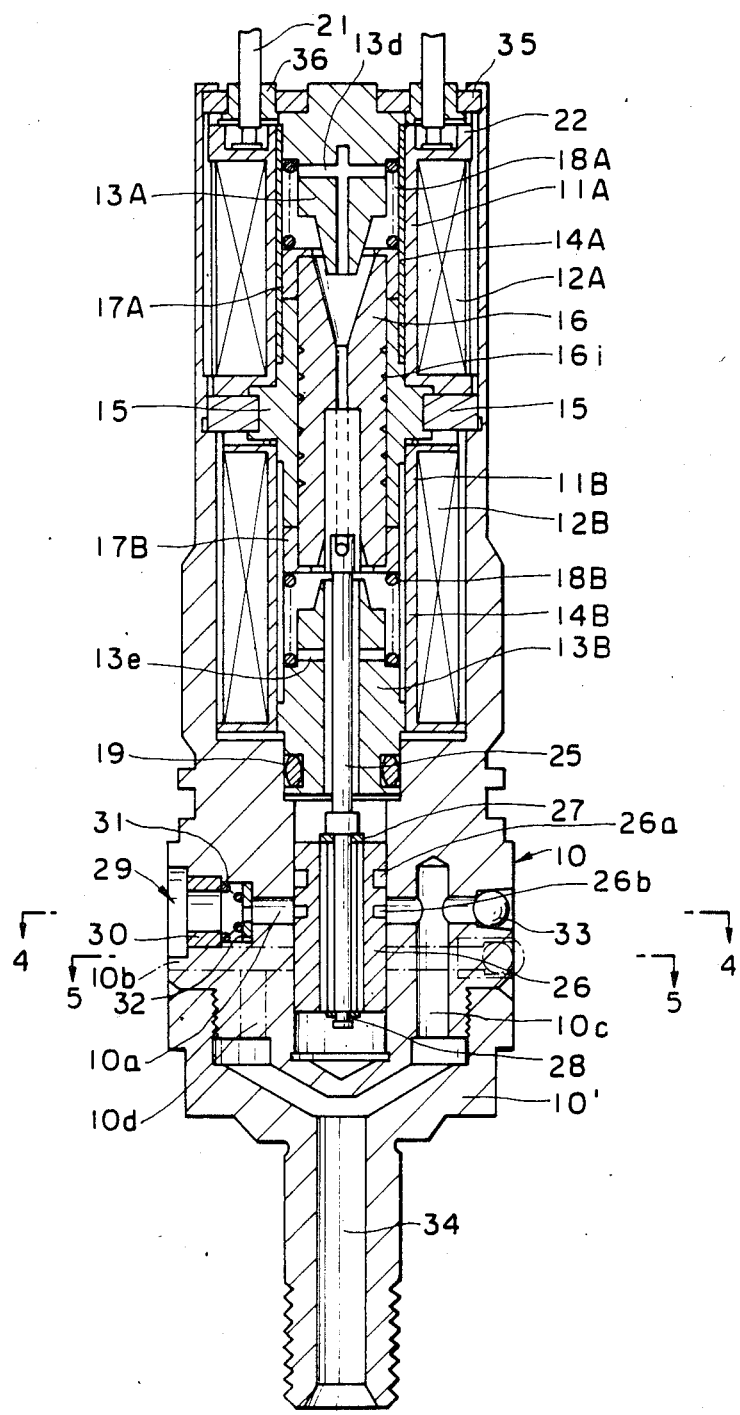
FIG. 3 is a longitudinal sectional view showing a second embodiment of the electromagnetic control valve.

When the plunger 16 is located in the neutral position in FIG. 3, the inlet side portion of each of the ports 10a communicates to the port 34 through the groove 26b of the valve body 26 and the longitudinal hole 10c in the yoke 10. Then, the inlet side portion of each of the ports 10b does not communicate to the port 34.

When the plunger 16 is located in one side position, i.e., in the upper position as viewed in FIG. 3, the respective inlet side portions of the ports 10a,10b do not communicate to the port 34 to be both completely closed.

When the plunger 16 is located in the other side position, i.e., in the lower position as viewed in FIG. 3, the inlet side portion of each of the ports 10a communicates to the port 34 through the groove 26a of the valve body 26 and the longitudinal hole 10c in the yoke 10, while the inlet side portion of each of the ports 10b communicates to the port 34 through the groove 26b of the valve body 26 and the longitudinal hole 10d in the yoke 10.

Thus, when the both ports 10a,10b are opened to one space and the port 34 is opened to the other space, the flow resistance of fluid flowing from one space to the other, and vice versa will be medium in said neutral position, large in said one side position and small in the other side position.

Since said second embodiment is less affected by the fluid acting on the valve body 26 than the first embodiment, the valve body 26 and the plunger 16 are stabilized. Also, the second embodiment is characterized in that even if the valve body 26 is located in the same position, two flow resistances are provided by the action of the flow control valve 29 according to the direction of the fluid flowing between the ports 10a,34.

Figure 8:
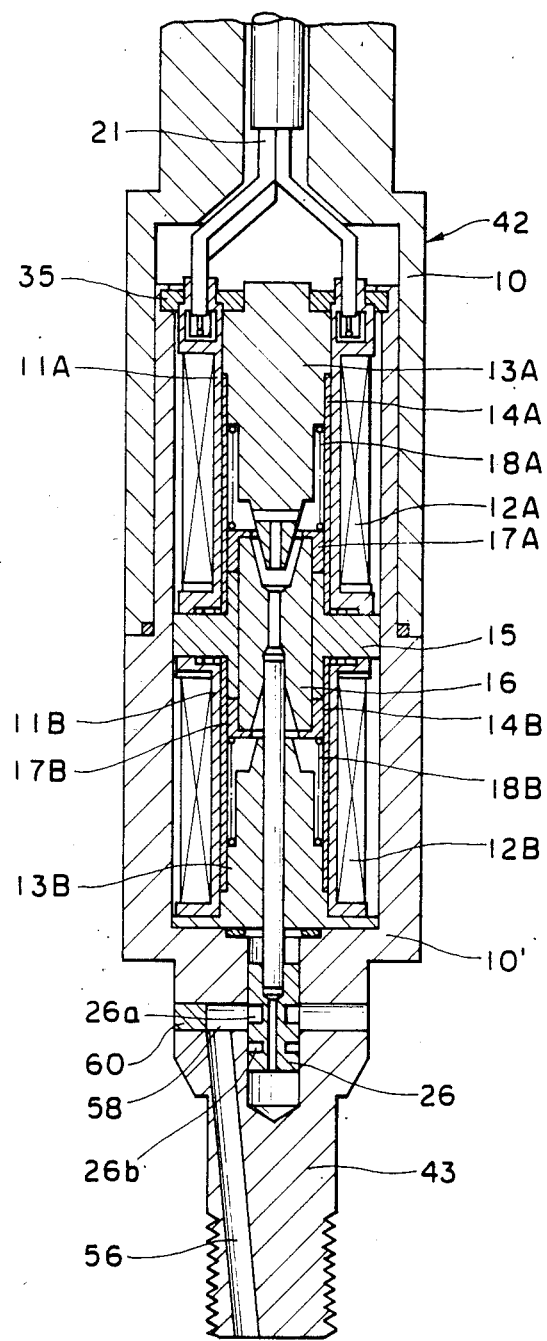
FIG. 8 is a longitudinal sectional view showing a third embodiment of the electromagnetic control valve.
Figure 9:
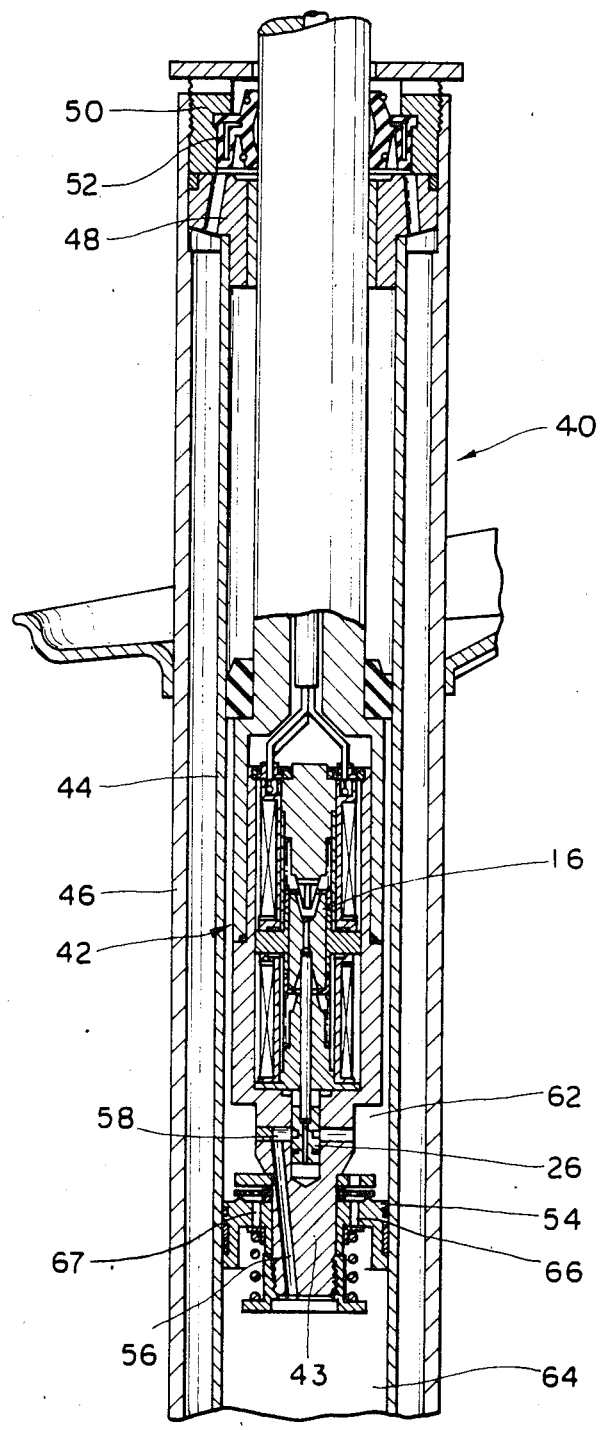
FIG. 9 is a longitudinal sectional view showing principal parts of a hydraulic buffer into which the electromagnetic control valve in FIG. 8 is incorporated.

A third embodiment of the present invention shown in FIGS. 8 and 9 is as same as the second embodiment except for the constitution which will be described hereinafter. The electromagnetic directional control valve in the third embodiment is incorporated in a hydraulic buffer.

The first yoke 10 and the second yoke 10' are connected to each other to be formed as a piston rod 42 which is disposed movably in a cylinder 44 of a hydraulic buffer 40.

The hydraulic buffer 40 is of so-called twin tube type provided with the cylinder 44 and a shell 46 disposed spaced from the cylinder 44. The cylinder 44 and the shell 46 are held on the upper ends by a rod guide 48 and a ring nut 50 and on the lower ends by a base valve case and a base cap which are well known per se. The piston rod 42 projects to the outside of the cylinder 44 while being set to the liquid-tight condition by a seal member 52 fixed to the ring nut 50.

An end 43 of the piston rod 42 is formed to serve as a mounting portion of a piston 54 and provided with first and second paths 56,58. The first path 56 extends obliquely over the piston mounting portion 43 while the second path 58 extends diametrically from the first path 56 to an outer peripheral surface. One opening of the second path 58 is sealed by a plug 60.

When the piston 54 is mounted on the end 43 of the piston rod 42, liquid chambers 62,64 defined at both sides of the piston 54 communicate to each other through the paths 56,58 in addition to ports 66,67 inherently provided in the piston 54.

Since liquid flows in and out diametrically of the valve body in the second and third embodiments, the valve body is not affected by a flow force of the liquid acting axially. Thus, the valve body and the plunger can remain securely in a predetermined position without any malfunctions. Also, since the valve body can be disposed spaced from coils or the like, the whole construction can be simplified without providing any ports in the yoke in consideration of such relationship.

Hereinafter will be described the operation of the third embodiment.

When the hydraulic buffer 40 is mounted on a suspension of an automobile, the shell 46 and the piston rod 42 are connected respectively to a suspension arm and a car body.

Current is supplied to the first and second coils 12A,12B manually by a driver or automatically by a CPU, i.e., computer for judging on the basis of signals from various sensors.

When the plunger 16 is located in the neutral position shown in the drawing, the liquid chambers 62,64 communicate to each other through the path 26a having a large section in the valve body 26 in addition to the ports 66,67 in the piston 54, so that when the piston 54 moves, liquid amount passing through the ports 66,67 will be reduced and the hydraulic buffer 40 will produce a small damping force.

When the plunger 16 is located in the upper one side position, the liquid chambers 62,64 communicate to each other through the path 26b having a small section in the valve body 26 in addition to the ports 66,67 in the piston 54, so that the hydraulic buffer 40 will produce a medium damping force.

When the plunger 16 is located in the lower other side position, the liquid chambers 62,64 communicate to each other only through the ports 66,67 in the piston 54, so that the hydraulic buffer 40 will produce a large damping force.

Next will be described the effects of the present invention with reference to said embodiments.

Figure 10:
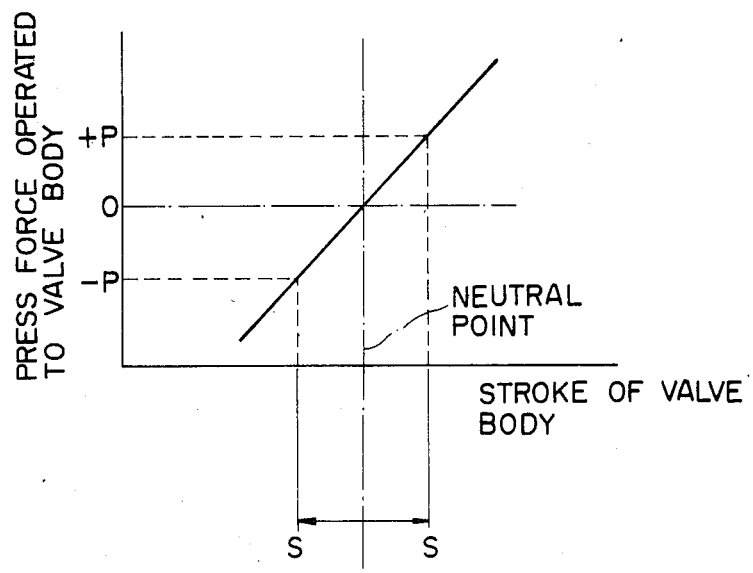
FIG. 10 is a diagram showing characteristics of a prior control valve.

First, the prior directional control valve shows characteristics shown in FIG. 10. That is, a press force of the spring constant composed of two springs multiplied by the stroke of movement of the valve body, i.e., the press force proportional to the stroke acts on the valve body. Thus, when a upward force $+P$ is applied to the valve body or a downward force $-P$ is applied to same, the valve body is moved upwardly or downwardly by the stroke S proportional to the force P from the neutral position in which it is held by the two springs so that the valve body is not stationarily stabilized in the neutral position.

Figure 11:
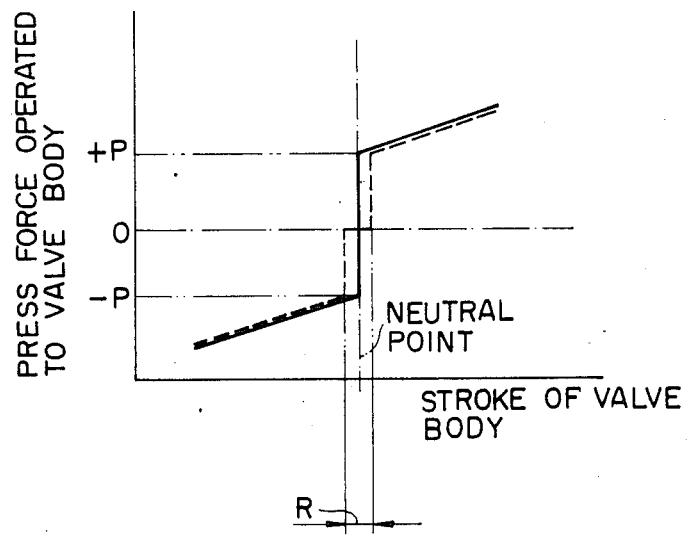
FIG. 11 is a diagram showing characteristics of the electromagnetic control valve according to the present invention.

On the other hand, the present invention has characteristics shown by the solid line in FIG. 11. Namely, when the plunger is moved upwardly from the neutral position by a small distance, the second spring 18B is regulated by the second stopper 17B as above described, so that the plunger 16 receives the load P set by the first spring 18A (hereinafter referred to as P for convenience) and when moved, further receives a press force proportional to the stroke (with the spring constant of only the first spring 18A being the proportional constant ). Similarly, when the plunger is moved downwardly, it receives same press force.

Accordingly, when the force acting on the plunger 16 and the valve body 26 is less than P, both are stabilized stationarily in the neutral position. Thus, even if the respective spring constants of the first and second springs 18A,18B are reduced, the plunger 16 and the valve body 26 are stopped stationarily by a certain stationary force when the predetermined set load P is applied to the spring by the compression thereof and the vibration force is less than P. Further, when a small clearance R exists between the plunger 16 and the first and second stoppers 18A,18B, as shown by the dotted line in FIG. 11, the plunger is moved by the small stroke R. However, it goes without saying that the plunger can receive a certain stationary force against the movement larger than the clearance R.

Also, the certain stationary force can be obtained even by reducing the spring constants of the first and second springs 18A,18B so that the present invention has excellent effects of providing the compact first and second coils 12A,12B.

What is claimed is:

1. An electromagnetic directional control valve for changing over flow paths of fluid between a first flow path and a second flow path, comprising:

a tubular case having at least one radial hole therethrough;
first and second electromagnetic means fixed in said case and spaced axially from each other;
a tubular core fixed in said case and disposed between said first and second electromagnetic means;
a plunger disposed in said core and operable to move from a neutral position in a first axial direction in response to activation of said first electromagnetic means and from said neutral position in a second axial direction in response to activation of said second electromagnetic means;
a first stopper member bearing against said core and movable together with said plunger at times when said plunger is moved in said first axial direction upon activation of said first electromagnetic means;
a second stopper member bearing against said core and movable together with said plunger at times when said plunger is moved in said second axial direction upon activation of said second electromagnetic means;
valve means movable with said plunger among three valve positions for selectively blocking said hole, connecting said hole to said first flow path, and connecting said hole to said second flow path; and
first and second means engaging said first and second stopper members for biasing said plunger toward the neutral position;
said plunger being selectively stopped at said neutral position by said first and second biasing means, at a first stop position against said first biasing means at times when said plunger is moved in said first axial direction upon activation of said first electromagnetic means, and at a second stop position against said second biasing means at times when said plunger is moved in said second axial direction upon activation of said second electromagnetic means, said valve means being in one of said three valve positions at times when said plunger is stopped at each of said neutral position, first stop position, and second stop position.

2. An electromagnetic directional control valve as claimed in claim 1, wherein said plunger occupies the neutral position when said first and second stopper members respectively bear against said core.

3. An electromagnetic directional control valve as claimed in claim 1, wherein said first and second stopper members respectively bear against end faces of said plunger.

4. An electromagnetic directional control valve as claimed in claim 1, wherein said first and second stopper members are made of non-magnetic material, and each of said first and second electromagnetic means has a stator core spaced axially from said plunger.

5. An electromagnetic directional control valve as claimed in claim 1, wherein:
said tubular core includes a port communicating with said hole of the tubular case; and
said first and second flow paths respectively include first and second path portions provided in said plunger and having different flow sections, said first and second path portions being selectively connectable to said hole of said case via said port of said tubular core.

6. An electromagnetic directional control valve as claimed in claim 5, wherein said plunger is substantially cylindrical.

7. An electromagnetic directional control valve as claimed in claim 1, wherein said valve means includes a valve body connected to said plunger, and said first and second flow paths respectively include first and second path portions provided in said valve body and having different flow sections.

8. An electromagnetic directional control valve as claimed in claim 7, wherein said valve body is connected to said plunger by an axial shaft.

9. An electromagnetic directional control valve as claimed in claim 7, wherein said valve body is substantially cylindrical.

10. An electromagnetic directional control valve as claimed in claim 9, wherein said first and second path portions are formed on an outer peripheral surface of said valve body and are axially spaced apart.

11. An electromagnetic directional control valve as claimed in claim 9, wherein fluid flow through said first and second path portions is substantially perpendicular to the axis of said cylindrical valve body.

12. An electromagnetic directional control valve, comprising:
 a. a tubular case having two ports;
 b. first and second axially spaced end cores fixed within said case;
 c. a tubular middle core fixed within said case and axially spaced between said first and second end cores;
 d. a plunger of magnetic material disposed in said middle core and axially movable between a first stop position adjacent said first end core and a second stop position adjacent said second end core, said plunger having first and second end portions respectively facing said first and second end cores;
 e. valve means movable with said plunger among three axially spaced valve positions for selectively blocking flow communication between said ports, connecting said ports along a first flow path, and connecting said ports along a second flow path;
 f. a first stopper member disposed in said case between said first end core and said middle core, said first stopper being axially movable between said first end core and said middle core;
 g. a second stopper member disposed in said case between said second end core and said middle core, said second stopper being axially movable between said second end core and said middle core;
 h. means for biasing said plunger in a neutral position between said first and second stop positions, said valve means being in one of said valve positions at times when said plunger is in said neutral position, said plunger biasing means including:
  first spring means for biasing said first stopper member toward said middle core, said first spring means bearing said first stopper member against said middle core at times when said plunger is in said neutral position or between said neutral position and said second stop position and bearing said first stopper member against said first end portion of said plunger at times when said plunger is between said neutral position and said first stop position, and
  second spring means for biasing said second stopper member toward said middle core, said second spring means bearing said second stopper member against said middle core at times when said plunger is in said neutral position or between said neutral position and said first stop position and bearing said second stopper member against said second end portion of said plunger at times when said plunger is between said neutral position and said second stop position;
 i. first electromagnetic means for selectively moving said plunger from said neutral position to said first stop position against said first spring means, said valve means being in a second one of said valve positions at times when said plunger is in said first stop position; and
 j. second electromagnetic means for selectively moving said plunger from said neutral position to said second stop position against said second spring means, said valve means being in the third one of said valve positions at times when said plunger is in said second stop position.

13. An electromagnetic directional control valve as claimed in claim 12, wherein said two ports include a first port having a radial hole in said tubular case and second port opening out of the longitudinal end of said case adjacent said second end core.

14. An electromagnetic directional control valve as claimed in claim 13, wherein:
 each of said plunger and said second end core includes a connecting port extending axially therethrough and in flow communication with said second port; and
 said first and second flow paths respectively include first and second path portions provided in said plunger, each of said path portions having an orifice in flow communication with said connecting port of said plunger, said orifices of said first and second path portions having different cross-sectional areas.

15. An electromagnetic directional control valve as claimed in claim 12, wherein said valve means includes a valve body connected to said plunger, and said first and second flow paths respectively include first and second path portions provided in said valve body and having different flow sections.

16. An electromagnetic directional control valve as claimed in claim 15, wherein said valve body is connected to said plunger by an axial shaft.

17. An electromagnetic directional control valve, comprising:
 a. a tubular case having at least one radial first port and a second port opening out of one longitudinal end of said case;
 b. first and second axially spaced end cores fixed within said case, said second end core having an axial connecting port in flow communication with said second port of said case;
 c. a tubular middle core fixed within said case and axially spaced between said first and second end cores;
 d. a plunger of magnetic material disposed in said middle core and axially movable between a first stop position adjacent said first end core and a second stop position adjacent said second end core, said plunger having first and second end portions respectively facing said first and second end cores, said plunger including an axial connecting port in flow communication with said connecting port of said second end core and first and second flow paths of different flow sections in flow communication with said connecting port of said plunger;
 e. a first stopper member disposed in said case between said first end core and said middle core, said first stopper being axially movable between said first end core and said middle core;

f. a second stopper member disposed in said case between said second end core and said middle core, said second stopper being axially movable between said second end core and said middle core;

g. means for biasing said plunger in a neutral position between said first and second stop positions, said first flow path of said plunger being connected to said first port of said case at times when said plunger is in said neutral position, said plunger biasing means including:

first spring means for biasing said first stopper member toward said middle core, said first spring means bearing said first stopper member against said middle core at times when said plunger is in said neutral position or between said neutral position and said second stop position and bearing said first stopper member against said first end portion of said plunger at times when said plunger is between said neutral position and said first stop position, and second spring means for biasing said second stopper member toward said middle core, said second spring means bearing said second stopper member against said middle core at times when said plunger is in said neutral position or between said neutral position and said first stop position and bearing said second stopper member against said second end portion of said plunger at times when said plunger is between said neutral position and said second stop position;

h. first electromagnetic means for selectively moving said plunger from said neutral position to said first stop position against said first spring means, said first and second flow paths of said plunger being blocked from flow communication with said first port of said case at times when said plunger is in said first stop position; and i. second electromagnetic means for selectively moving said plunger from said neutral position to said second stop position against said second spring means, said second flow path of said plunger being connected to said first port of said case at times when said plunger is in said second stop position.

18. An electromagnetic directional control valve, comprising:

a. a tubular case having at least two axially spaced first ports extending radially therethrough and a second port opening out of one longitudinal end thereof;

b. first and second axially spaced end cores fixed within said case;

c. a tubular middle core fixed within said case and axially spaced between said first and second end cores;

d. a plunger of magnetic material disposed in said middle core and axially movable between a first stop position adjacent said first end core and a second stop position adjacent said second end core, said plunger having first and second end portions respectively facing said first and second end cores;

e. a valve body fixed to said plunger by an axial shaft, said valve body including axially spaced first and second flow paths having different flow sections;

f. a first stopper member disposed in said case between said first end core and said middle core, said first stopper being axially movable between said first end core and said middle core;

g. a second stopper member disposed in said case between said second end core and said middle core, said second stopper being axially movable between said second end core and said middle core;

h. means for biasing said plunger in a neutral position between said first and second stop positions, said first flow path of said valve body connecting one of said first ports to said second port at times when said plunger is in said neutral position, said plunger biasing means including:

first spring means for biasing said first stopper member toward said middle core, said first spring means bearing said first stopper member against said middle core at times when said plunger is in said neutral position or between said neutral position and said second stop position and bearing said first stopper member against said first end portion of said plunger at times when said plunger is between said neutral position and said first stop position, and second spring means for biasing said second stopper member toward said middle core, said second spring means bearing said second stopper member against said middle core at times when said plunger is in said neutral position or between said neutral position and said first stop position and bearing said second stopper member against said second end portion of said plunger at times when said plunger is between said neutral position and said second stop position;

i. first electromagnetic means for selectively moving said plunger from said neutral position to said first stop position against said first spring means, said valve body blocking said first ports from flow communication with said second port at times when said plunger is in said first stop position; and j. second electromagnetic means for selectively moving said plunger from said neutral position to said second stop position against said second spring means, said first and second flow paths of valve body connecting both of said first ports to said second port at times when said plunger is in said second stop position.

* * * * *